June 24, 1930.   J. B. HENDERSON   1,765,584
BEARING
Filed June 19, 1926    2 Sheets-Sheet 1

INVENTOR
James B. Henderson
BY Moakley & Gill
ATTORNEYS

June 24, 1930. J. B. HENDERSON 1,765,584
BEARING
Filed June 19, 1926 2 Sheets-Sheet 2
Fig. 3. Fig. 4.
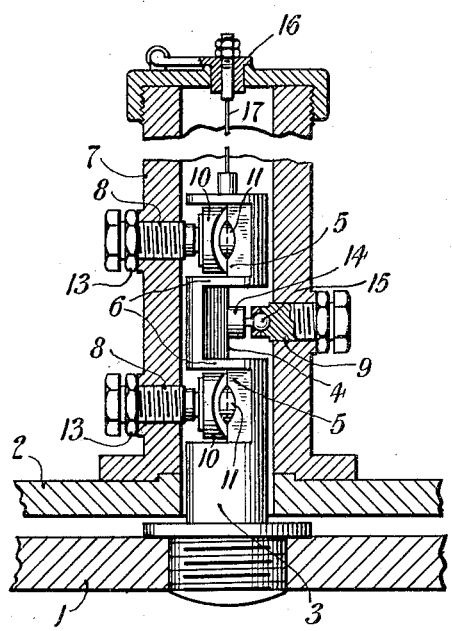
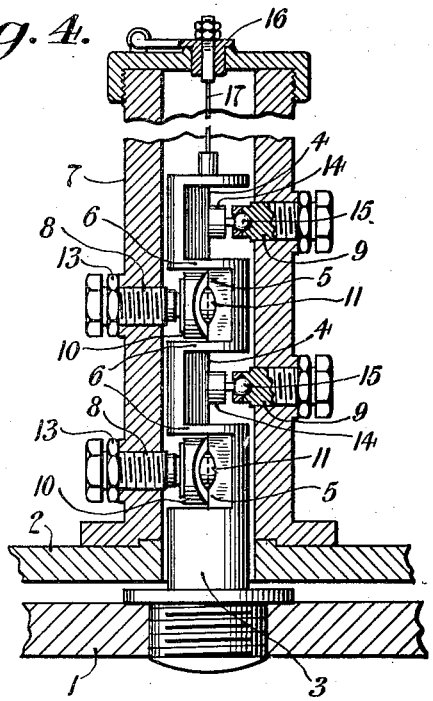
Fig. 5.
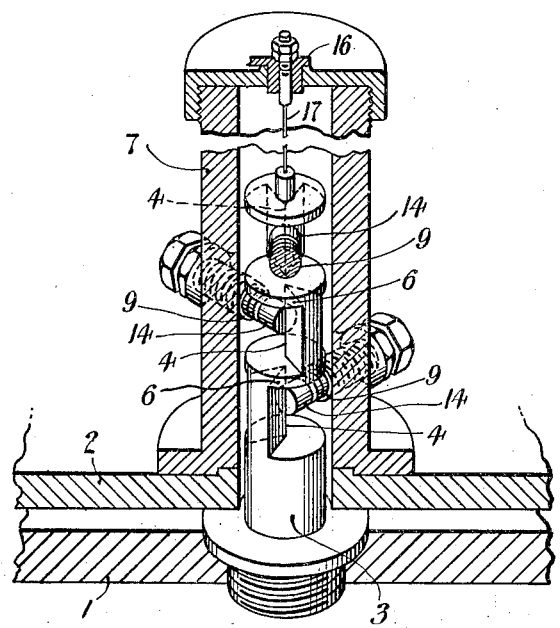
INVENTOR
James B. Henderson
BY Moakley & Gill
ATTORNEYS Patented June 24, 1930

1,765,584

UNITED STATES PATENT OFFICE

JAMES BLACKLOCK HENDERSON, OF BLACKHEATH, ENGLAND

BEARING

Application filed June 19, 1926, Serial No. 117,178, and in Great Britain June 22, 1925.

My invention is concerned with means to eliminate or at least to diminish to a considerable extent friction in the bearings between two elements mounted for relative motion about a vertical axis.

Heretofore the reduction of friction in vertical axes has been effected principally by the use of ball bearings, combined in certain cases with the introduction of a follow-up movement to cause the outer part of the ball bearing to follow the inner part, or vice versa. In certain cases also one of the two relatively movable elements has been kept in a state of constant reciprocating movement either in the plane of the relative movement or in the direction of the axis of the bearing.

In my co-pending United States application for Letters Patent Serial, No. 117,179 I have described in connection with gyroscopic apparatus a novel method of obtaining still greater freedom from friction about a vertical axis by suspending one of the elements from the other on two knife-edge trunnion axes inclined substantially at 45° to the vertical and at 90° to each other, so that for a single movement about a vertical axis is substituted a compound movement about both these inclined axes. In a co-pending British application No. 9869/26 I have also described a novel type of self-aligning support for knife-edge trunnions, of which use is made in my application Serial No. 117,179, already referred to.

In the present invention I have evolved still another method of obtaining a similar freedom from friction by using knife-edge trunnions in combination with a single vertical axis in which I incorporate the V-support described in my co-pending application No. 9869/26 in combination with other novel features not heretofore described. The method adopted is clearly shown in the accompanying drawing which shows a preferred form of my invention and in which—

Fig. 3 is another vertical section through a modified form of bearing;

Fig. 4 is a similar view through another modified type of bearing; and

Fig. 5 is another vertical view, in perspective, through a bearing having differently arranged knife edges.

Figure 1:
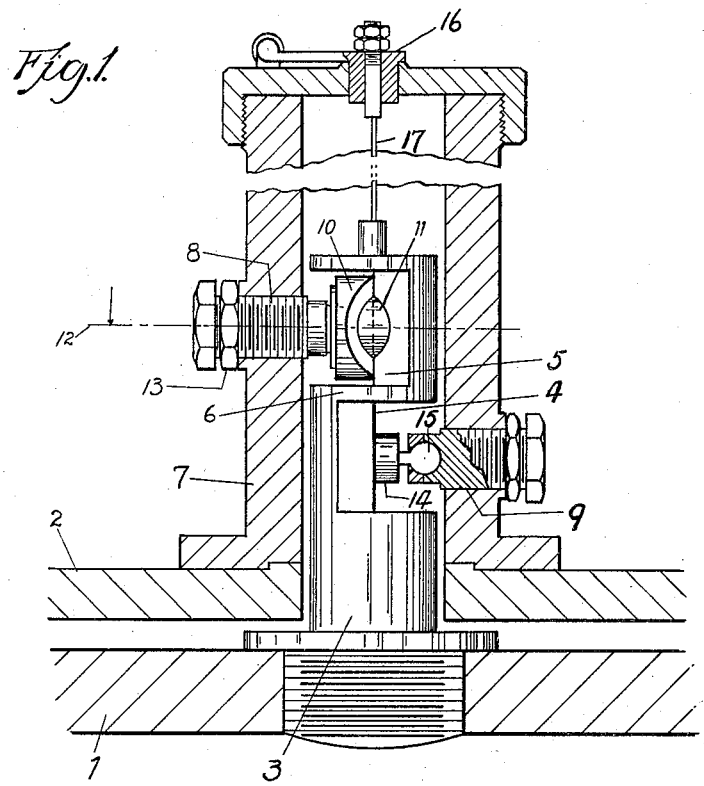
Fig. 1 is a vertical sectional view, partly in elevation of the entire bearing.

In this drawing 1 represents the body to be mounted for movement about a vertical axis relatively to a second body 2. To the body 1 I attach two vertical trunnions, one at the top and one at the bottom, only the top one being shewn in the drawing, numbered 3, since the other is merely a replica of it. In the description which follows it should therefore be understood that, unless otherwise stated, every element shown is duplicated at the bottom pivot also.

The cylindrical trunnion 3 is ground away at two or three places to form knife-edges, such as 4 and 5, the edges being accurately located on the central axis of the trunnion and cylindrical portions, such as 6, being left between the ground sections. Where two knife-edges are used, as shown, they should be situated at 180° with reference to each other.

Figure 2:
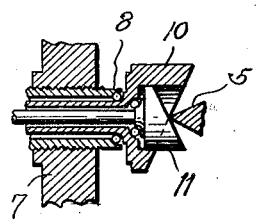
Fig. 2 is a horizontal section along the line 12 of Fig. 1 through the V-support.

The trunnion 3 is housed within a hollow trunnion 7 mounted on the supporting body 2 coaxially with the trunnion 3 and is centralized by screwed plugs or members 8 and 9 which are screwed radially into the wall of the outer trunnion 7. The screw 8 forms the base of a small self-aligning V support of the type described in my co-pending application Serial No. 117,179, and shown in Fig. 2 of this application consisting of two coaxial cylindrical blocks 10 and 11, mounted for rotary movement relatively to each other and to the screw 8 about an axis 12 at right angles to the knife-edge 5, the exposed plane surfaces of the blocks 10 and 11 forming a self-aligning support for the knife-edge, and the whole being capable of adjustment along the axis 12 by means of the screw 8 which can be locked by the lock-nut 13.

A similar adjustment of the screw 9 is used to position a small cylindrical block 14 against the knife-edge 4, the block 14 being carried by a ball 15 housed in a spherical bearing in the screw 9.

To support the weight of the body 1 the upper extremity of the trunnion 3 is attached by means of a filar 17 to a torsion head 16 of suitable type carried by the hollow trunnion 7, or I may support it from below by a suitable thrust element associated with the bottom trunnion, preferably a wire cage arrangement of the type described in my co-pending application Serial No. 749,940.

Preferably, and in all cases where a wide latitude of angular movement of the body 1 about its vertical axis is required, I cause the body 2 to follow all movements of the body 1 about the knife-edge trunnion axis, but if only a very small movement in azimuth is contemplated this might be dispensed with, provided that precautions are taken to avoid undue torsional stiffness in the filar 17 or any other means employed to support the weight of the body 1. If a follow-up movement is used I may employ any of the known systems of follow-up control to produce the requisite movement, but as this forms no part of the present invention, and the principle is well known, I do not illustrate any particular type of follow-up mechanism. To avoid wear on the knife edges, however, which would be greatly increased by "hunting" of the follow-up, I preferably employ means to eliminate hunting of the follow-up such as I have already described in my co-pending application Serial No. 433,732.

The above description refers to a preferred form of my invention, but it is capable of considerable variation in structure without variation in principle. It will be recognized that an axis supported on three knife edges by two sets of self-aligning V's of the type described and one single self-adjusting plane surface, the V's being arranged one above the other and facing in the same direction, with the single plane surface between them and facing in the opposite direction to the V's, will be under complete radial constraint. That is to say, the underlying principle of my invention involves the use of a minimum of three knife edges and five constraining plane surfaces, and this simplest form is sufficient where a single trunnion can provide the constraint required, or where the single plane surface can conveniently be located at a point substantially midway between the two V's so as to equalize their radial loads. In cases where two trunnions are preferable, as in the case which I have illustrated, it will usually be impossible to position the fifth plane at anything like the midpoint, in which case the addition of a sixth plane surface and a fourth knife edge to provide the construction illustrated is preferable. It will also be obvious that by the addition of extra knife edges all the plane surfaces can be separated, so that each trunnion would be supported by, say, three knife edges located at 120° apart angularly, each opposed by a separate self-adjusting plane surface. The form illustrated, however, is the most practical form in addition to demanding the smallest number of surfaces and the smallest number of adjustments.

I claim:—

1. A knife edge bearing for the relative motion of two members which are required to have limited relative movement about an axis substantially vertical with minimum friction, comprising three vertical and colinear knife edges on one of the members engaging with five plane surfaces on the other member, each of said surfaces being arranged to provide line contact with one of said knife edges.

2. A knife edge bearing for the relative motion of two members required to have limited relative movement about an axis substantially vertical, comprising three vertical and colinear knife edges on one of the members engaging with five plane surfaces on the other member, said surfaces being arranged in two pairs each associated with a single knife edge and a single plane surface associated with a knife edge situated between the other two edges.

3. A knife edge bearing for two members required to have relative movement about a vertical axis comprising vertical and colinear knife edges on one member engaging with plane surfaces on the other member, said surfaces being arranged singly and in pairs and means supporting one of said members in a direction coincident with the axis of oscillation of the knife edges.

4. A knife edge bearing for two members having a relative movement about a vertical axis comprising a plurality of colinear and vertical knife edges on one member associated with a plurality of plane surfaces on the other member, said surfaces being self-adjusting into line contact with said edges, and means supporting one of said members in a direction coincident with the axis of oscillation of the knife edge.

5. A knife edge bearing for two members having relative movement about a vertical axis comprising at least three knife edges on one member engaging with at least five plane surfaces on the other member, and means to adjust said surfaces in a direction at right angles to said edges.

6. A knife edge bearing for two members having relative movement about a vertical axis comprising at least three knife edges arranged colinear and vertical on one member engaging with at least five plane surfaces on the other member, at least two of said surfaces being arranged to form a pair providing a V-shaped support for a single knife edge and having a self-adjusting movement to align themselves with said edge about a common axis at right angles to said edge.

7. A knife edge bearing for two members having a relative movement about a vertical axis comprising a plurality of knife edges arranged vertically and colinear on one member and engaging with a plurality of plane surfaces on the other member, said surfaces being arranged partly in pairs, each pair associating with a single knife edge and partly in single surfaces each associating with a knife edge, and means to support the weight of one of the members in the direction of the knife edges.

JAMES BLACKLOCK HENDERSON.